US007737395B2

(12) United States Patent
Goodley et al.

(10) Patent No.: US 7,737,395 B2
(45) Date of Patent: Jun. 15, 2010

(54) APPARATUSES, METHODS AND COMPOSITIONS FOR IONIZATION OF SAMPLES AND MASS CALIBRANTS

(75) Inventors: Paul C. Goodley, Healdsburg, CA (US); Harry F. Prest, Santa Cruz, CA (US); Christine A. Miller, Campbell, CA (US); Patrick D. Perkins, Sunnyvale, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 341 days.

(21) Appl. No.: 11/757,369

(22) Filed: Jun. 2, 2007

(65) Prior Publication Data

US 2008/0067336 A1 Mar. 20, 2008

Related U.S. Application Data

(63) Continuation-in-part of application No. 11/523,963, filed on Sep. 20, 2006, now abandoned.

(51) Int. Cl.
*B01D 59/44* (2006.01)

(52) U.S. Cl. ....................... 250/282; 250/281; 250/284; 250/288

(58) Field of Classification Search ................. 250/281, 250/282, 284, 288
See application file for complete search history.

(56) References Cited

U.S. PATENT DOCUMENTS

| | | | |
|---|---|---|---|
| 5,838,002 | A | 11/1998 | Sheehan |
| 6,465,776 | B1 | 10/2002 | Moini et al. |
| 6,784,422 | B2 | 8/2004 | Covey et al. |
| 6,841,774 | B1 | 1/2005 | Weiss |
| 6,979,816 | B2 | 12/2005 | Tang et al. |
| 7,265,347 | B2 | 9/2007 | Guevremont et al. |
| 7,303,727 | B1 | 12/2007 | Dubrow et al. |
| 7,399,961 | B2 | 7/2008 | Chen et al. |
| 2002/0117629 | A1 | 8/2002 | Fujimaki et al. |
| 2004/0232326 | A1 | 11/2004 | Guevremont et al. |
| 2005/0072915 | A1 | 4/2005 | Stults et al. |
| 2005/0258359 | A1 | 11/2005 | Guevremont et al. |
| 2007/0164231 | A1 | 7/2007 | Truche et al. |
| 2008/0067336 | A1 | 3/2008 | Goodley et al. |
| 2008/0083873 | A1 | 4/2008 | Giardina |

FOREIGN PATENT DOCUMENTS

| | | |
|---|---|---|
| GB | 2410370 | 7/2005 |
| WO | WO2004112074 | 12/2004 |
| WO | 2006093920 | 9/2006 |
| WO | WO2006107831 | 10/2006 |

OTHER PUBLICATIONS

Hatakeyama et al., "Microgram-Scale Testing of Reaction Conditions in Solution Using Nanoliter Plugs in Microfluidics with Detection by MALDI-MS", Journal of the American Chemical Society, vol. 128, No. 8, 2006, pp. 2518-2519.*

GB Search Report datd May 28, 2008, 1 page, in Application No. GB0717259.6, corresponding to U.S. Appl. No. 11/757,369.

* cited by examiner

*Primary Examiner*—David A Vanore

(57) ABSTRACT

The present invention provides, inter alia, apparatuses and methods for ionizing samples that are in gaseous phase or can be vaporized/sublimated. The samples include samples to be analyzed and mass calibrants that serve as standards. In addition, the present invention also provides calibrant formulations that release mass calibrants in a slow, controlled manner.

10 Claims, 4 Drawing Sheets

APPARATUSES, METHODS AND COMPOSITIONS FOR IONIZATION OF SAMPLES AND MASS CALIBRANTS

RELATED APPLICATIONS

This application is a continuation-in-part of U.S. patent application Ser. No. 11/523,963, filed Sep. 20, 2006, now abandoned which is incorporated by reference in its entirety.

BACKGROUND OF THE INVENTION

Analyte samples can be delivered to an ionization source of a mass spectrometer in a variety of forms, in solid, liquid and gaseous phases. When analytes are provided in liquid and gaseous phases, they are typically sorted by chromatography, either high performance liquid chromatography (HPLC) for liquid analytes, or gas chromatography (GC) for gas analytes. Separation of analyte molecules allows the mass spectrometer downstream to evaluate the analyte molecules sequentially so that they can be more easily scanned in a mass analyzer.

Chromatography requires specialized instrumentation, such as separation columns, and an appropriate interface to an ionization source. Moreover, the chromatography separation process often takes an hour or more to complete. The instrumentation may not be available outside of the laboratory context and the duration of the separation process may be an inconvenience when it is desired to identify a trace substance quickly. As an example, at a location where it is believed that a small, but possibly dangerous level of a toxic substance has been released into the atmosphere, it would be desirable to analyze a sample of ambient air at the location for the toxic substance directly, without necessarily having to pass the sample through a chromatography apparatus.

DETAILED DESCRIPTION

The present invention provides, inter alia, apparatuses and methods for ionizing samples that are in gaseous phase or can be vaporized. The samples include samples to be analyzed and mass calibrants that serve as standards. In addition, the present invention also provides calibrant formulations that release mass calibrants in a slow, controlled manner.

Prior to describing the invention in further detail, the terms used in this application are defined as follows unless otherwise indicated.

DEFINITION

It is initially noted that reference to a singular item herein includes the possibility that there are plural of the same items present. More specifically, as used herein and in the appended claims, the singular forms “a”, “an”, “said” and “the” include plural referents unless the context clearly dictates otherwise.

The term “adjacent” means near, next to or adjoining. Something adjacent may also be in contact with another component, surround (i.e. be concentric with) the other component, be spaced from the other component or contain a portion of the other component.

A “mass spectrometer system” is a system that can be used to obtain the mass spectrum of a sample. A mass spectrometer system typically comprises an ion source, a mass analyzer, an ion detector and a data system. The ion source contains an ion generator which generates ions from the sample, the mass analyzer analyzes the mass/charge properties of the ions, the ion detector measures the abundances of the ions, and the data system processes and presents the data. Instrumental parameters such as voltages are usually set and controlled by a control system, which is often integrated with the data system. The mass spectrometer system may comprise additional components, such as ion guides or collision cells.

A “tandem mass spectrometer system” is a mass spectrometer system designed to perform multiple, sequential mass analysis steps. For example, a tandem mass spectrometer system may comprise a first-stage mass analyzer to select analyte ions of certain mass-to-charge ranges, a collision cell downstream from the mass filter to fragment the selected ions (precursor ions or parent ions) to produce daughter ions, and a second-stage mass analyzer downstream from the collision cell to analyze the mass-to-charge properties of the daughter ions.

As used herein, “downstream” indicates a later event or position in the direction of ion flow. Conversely, “upstream” indicates an earlier event or position in the direction of ion flow. Thus, if a second chamber is downstream from a first chamber, ions will enter the first chamber before entering the second chamber. The first and second chambers may be directly adjacent to each other, or separated by other components, such as ion guides or additional chambers.

Apparatuses and Methods

Figure 1:
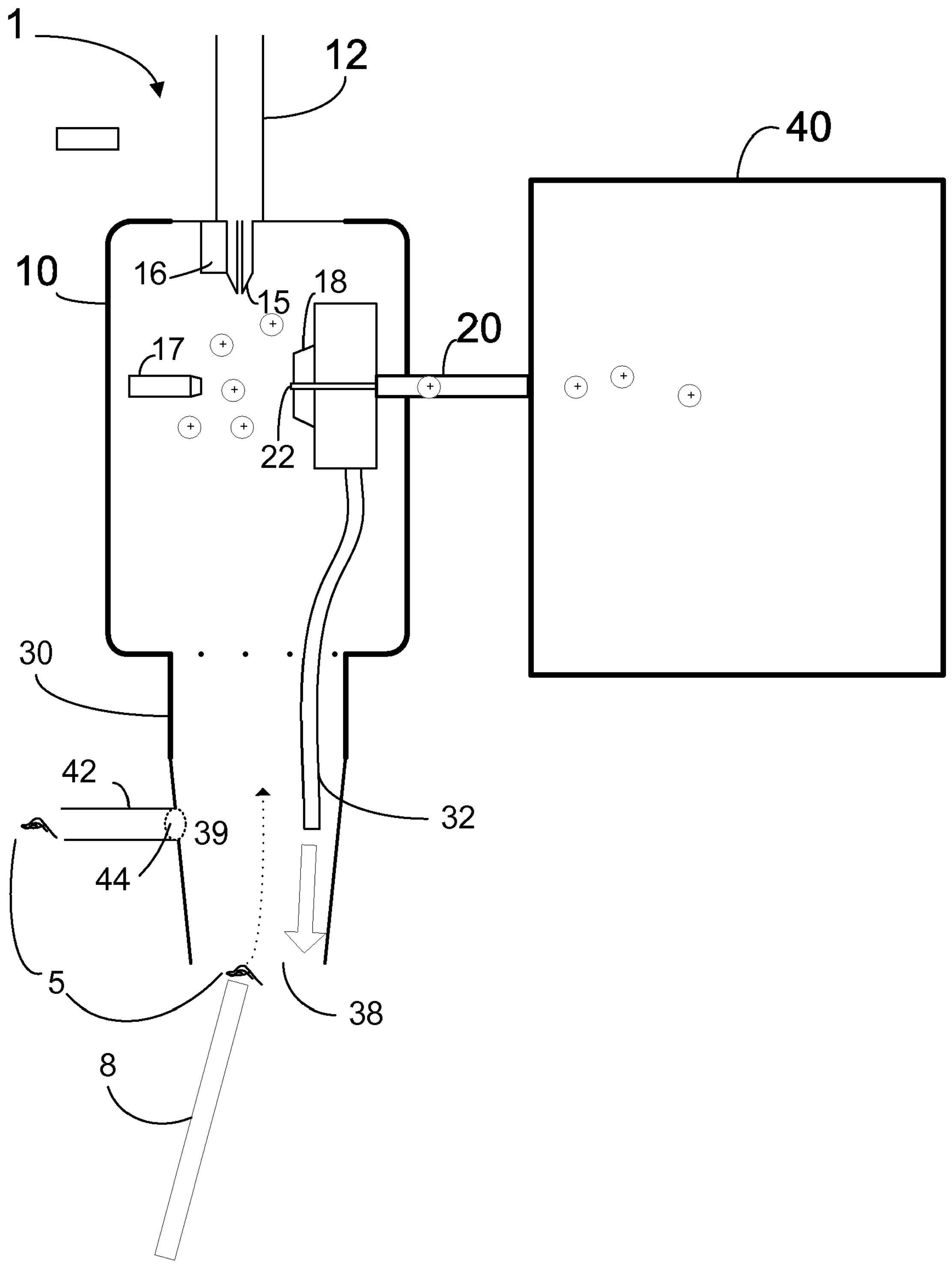
FIG. 1 is a schematic illustration of an ionization apparatus according to the present invention coupled to a mass spectrometer.

FIG. 1 schematically illustrates an example embodiment of an apparatus for ionizing a sample according to the present invention. As shown, the apparatus 1 is coupled to a mass spectrometer 40.

The apparatus 1 includes an ionization chamber 10 in which ions are generated. An ionization device 15, which may comprise an electrospray tip, for example, extends into (or is enclosed by) the ionization chamber 10 and generates primary ions by mechanisms well known in the art from a gas/liquid aerosol that is present within the ionization chamber or supplied to the ionization chamber via a first passageway 12. The primary ions may include ions generated from a neutral analyte sample delivered to the ionization chamber through the first passageway 12 and/or ions generated from other reactive substances provided or present within the ionization chamber such as water (hydronium and hydroxyl ions) or ammonia in vapor or liquid form.

The space within the ionization chamber 10 in which primary ions are generated is termed the ionization region. It is noted that while electrospray is a particularly suitable ionization technique, other ionization modes can also be used to generate primary ions such as high-velocity gas impact, electron capture or impact, electron transfer, chemical ionization and photoionization. The primary ions may be generated continuously or periodically during operation of the ionization device 15 to maintain a desired concentration of primary ions within the ionization region. A portion of the primary ions may be directed by electric fields towards an orifice 22 that leads downstream to a mass spectrometer 40 via a second passageway 20. In some embodiments, the concentration of primary ions within the ionization region is maintained such that a sufficient number of primary ions can interact with neutral molecules as described below.

A third passageway 30 extends from the ionization chamber 10 and has an orifice 38 at its distal end. Gas-borne molecules can enter the apparatus 1 by entering the orifice 38 and diffusing through the length of the first passageway 30 into the ionization chamber 10. A sample 5 may thus be placed adjacent to the orifice 38 in order to introduce gas-borne neutral sample molecules into the ionization chamber 10 via such diffusion. In the example embodiment depicted, the sample is placed onto a sample support 8 (in solution or otherwise) positioned adjacent to the orifice 38. Alternatively, instead of placing the sample 5 near orifice 38, an orifice can be created at any location on the wall of passageway 30 for sample uptake. For example, an optional orifice 39 is shown in FIG. 1, which is connected to an optional conduit 42 to receive a sample (5).

The sample 5 may be in solid, liquid or gaseous form. Volatilization and diffusion of neutral sample molecules can occur even if the sample 5 is prepared in condensed phase since some amount, albeit a small concentration thereof, is volatized from the sample at room temperature by evaporation or sublimation. Heat may also be applied to the sample 5 to promote volatilization and to speed up the ionization and detection process as will be discussed below. The concentration of gaseous neutral molecules that diffuse through the third passageway can be limited using plugged stoppers, microvalves, etc. positioned within the third passageway 30. For example, an optional microvalve 44 is shown for conduit 42.

In the depicted embodiment, the third passageway 30 may also serve as a passageway for the release of exhaust gases such as $N_2$ purge gas emanating from the apparatus 1 into the ambient atmosphere. In some embodiments, part of the exhaust gases may be expelled through an exhaust conduit 32 that extends for some length in the third passageway 30. An interesting feature of the apparatus disclosed herein is that the flow of exhaust gas through the third passageway 30 does not eliminate the back diffusion of gaseous molecules in the opposite direction. It has been found that the length of the exhaust conduit 32 and the associated exhaust flow rate affects the rate of back diffusion from the environment into the ion source; greater vent lengths increase resistance and thus decrease the back diffusion rate, but do not affect the signal response.

When the gaseous neutral molecules diffuse through the length of the third passageway 30 into the ionization chamber 10 they pass into the ionization region. They can be ionized by the ionization device 15. In addition, the neutral molecules can encounter primary ions present within the ionization region, and a portion of the neutral molecules can be ionized by charge transfer and possibly other electro-physical interactions with the primary ions. A neutral molecule [M] either obtains a proton though charge transfer with a positive (or negative) primary ion such as a hydronium ion:

$$M^{o}+HA^{+}\rightarrow[M+H]^{+}+A^{o}$$

or the neutral molecule loses a proton through charge transfer with a negative primary ion such as a hydroxyl ion:

$$M^{o}+HB^{-}\rightarrow[M-H]^{-}+B^{o}$$

A single charge (positive or negative) or multiple charges may be transferred from the primary ions to the neutral molecules. Preferably, a single charge is transferred.

It is emphasized that the charge transfer process whereby the neutral molecules are ionized by charge transfer with primary ions is a low-energy "soft ionization" process in which energy interactions are typically on the order of 2-20 eV (electron volts). This is in contrast to "hard" ionization techniques such as occur in atmospheric pressure chemical ionization (APCI) in which molecules are ionized by intense energy fields on the order of 100-1000 eV which are generated by corona discharge. By employing a soft ionization technique to produce secondary ions, ion suppression that can arise when dual 'hard' ionization sources are employed is largely avoided.

Once the neutral molecules derived from the sample are ionized in the ionization region they become subjected to an electric field produced in this region by the combined action of several electrodes 16, 17, 18 maintained at different voltages. The electric field guides the ions in the ionization region toward a low pressure region in front of the orifice 22 of the second passageway 20 that leads toward the mass spectrometer 40. In the example embodiment, a first electrode 16 is positioned above the ionization region, a second electrode 17 is positioned opposite the orifice of the second passageway 20, and a third electrode 18 is positioned adjacent to the orifice 22 of the second passageway. It is noted however, that the configuration of the electrodes 16, 17, 18 is merely exemplary and other configurations, and a different number of electrodes, may be employed to create electric fields suitable for directing ions in the ionization region toward the orifice 22 of the second passageway 20. Ions that reach the orifice 22 are pulled through into the second passageway by the pressure differential between the second passageway 20 and the ionization chamber 10.

Ions guided into the orifice 22 of the second passageway 20 are guided further downstream by pressure differentials, electrodes and other ion optics into the mass spectrometer 40, which may comprise any known mass analyzer devices, including but not limited to: quadrupole, ion trap (linear or two-dimensional), time-of-flight (TOF), orbitrap, and FT-ICR (Fourier Transform Ion Cyclotron Resonance) devices. The spectrometer may comprise single mass analyzer or a tandem (MS/MS) configuration including more than one mass analyzer arranged in sequence. The ions guided into the mass spectrometer 40 are filtered and detected within the mass spectrometer. A mass spectrum indicating abundance of detected ions according to mass/charge ratio is generated thereby.

One of the advantages of the above-described ion source and associated ionization method is that it is capable of providing extremely small concentrations of sample ions to the mass spectrometer that are detectable. If an extremely sensitive mass analyzer is employed, such as a time-of-flight (TOF), it is possible for sample levels on the order of 1 part per $10^{14}$ to $10^{16}$ to be detected and identified. Thus, the sensitivity can be, for example, about $10^{5}$, $10^{6}$, $10^{7}$, $10^{8}$, $10^{9}$, or $10^{10}$ ppm.

It should be noted that the sample can be an analyte sample or a mass calibrant. Thus, the ionization apparatuses of this invention, such as the embodiments discussed in FIG. 1, can be used to ionize analyte samples and/or mass calibrants. Particularly when time-of-flight spectrometers are employed (as they often are in many applications due to their high sensitivity and infinite mass range) dynamic mass calibration is typically necessary because of slight dimensional changes that occur in the spectrometer flight tube. These changes affect the flight times of the ions within the flight tube and can alter the detection results. When a mass calibrant of known mass/charge ratio (which can also be referred to as a reference mass or lock mass) is ionized in conjunction with analytes, the detected mass/charge ratio of the mass calibrant can be used to determine a correction factor to compensate for changes in the flight tube length. For example, the ionization apparatus of FIG. 1 may receive an analyte sample through passageway 12 and a calibrant through passageway 30, or vice versa. In this manner, the analyte and calibrant are both ionized and sent to the mass spectrometer in a mixture, and the calibrant can serve as an internal standard. Alternatively, if the user of the ionization apparatus only intends to ionize an analyte sample or a calibrant, but not both, the ionization apparatus can be coupled to a supply of analyte sample or calibrant only.

Figure 2:
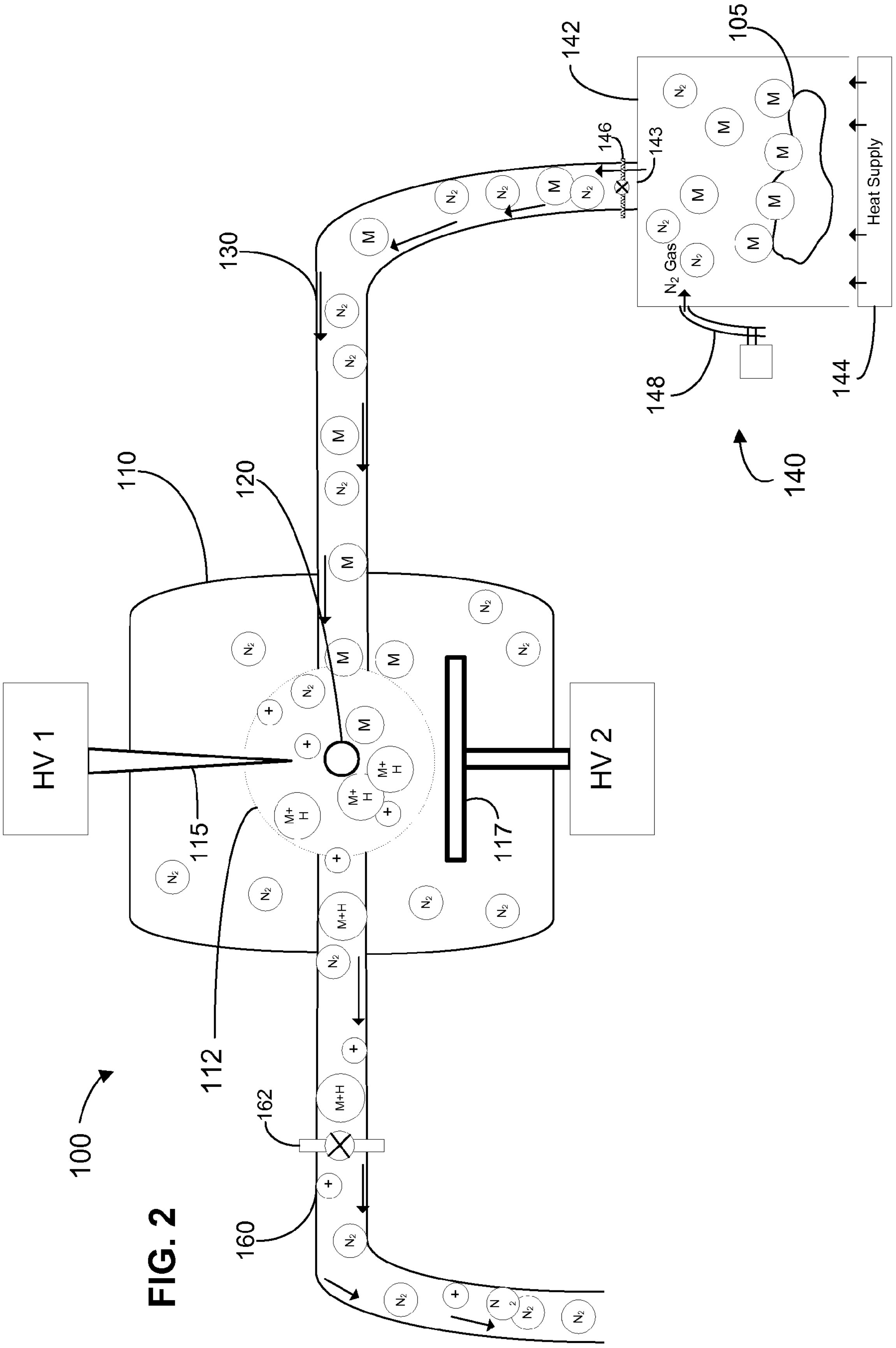
FIG. 2 shows another embodiment of an ionization apparatus according to the present invention.

FIG. 2 shows another embodiment of an ion source according to the present invention. In this embodiment, the ion source provides a flow-through system in which heat may be applied to volatize a portion of a sample, and a slight gas flow facilitates the passage of volatized sample molecules into the ionization chamber.

As shown, the apparatus 100 includes an ionization chamber 110 having an ionization region 112 in which primary ions are generated. A first passageway (not depicted in FIG. 2; the first passageway would be coming from out of the page toward the ionization chamber) may be directly coupled to the ionization chamber to provide substances from which the primary ions are generated, and a second passageway 120 leads toward a mass spectrometer, as in the embodiment depicted in FIG. 1. In the embodiment depicted in FIG. 2, the ions are generated by applying a high voltage generated by high-voltage power supply HV 1 to a primary electrode 115, which may comprise an electrospray tip. The ions generated in the ionization region by action of the primary electrode are denoted (+) and the gaseous molecules which have undergone charge transfer are denoted (M+H)+ in the figure. Although positive ions are shown as examples, it should be noted that both positive and negative ionizations are contemplated in this invention.

One of the useful features of the embodiment depicted in FIG. 2 is the modular sample region 140 that conveniently supplies gaseous neutral molecules to the ionization chamber 110. The sample region 140 includes a sample chamber 142 which may comprise a housing or enclosure with hatch or door (not shown) that may be opened to place a sample 105 within the chamber and closed to protect the sample from contamination, and an exit orifice 143. The sample may be in solid, liquid or gaseous form, and it may be an analyte sample or a calibrant. A heating device 144 is coupled to or positioned adjacent to the chamber 142, preferably towards the bottom of the chamber near to where the sample is positioned. The heat generated by the device 144 is applied to the sample 105. Sufficient heat is supplied to volatize molecules on the surface of the sample 105. A low volume gas flow of nitrogen (or another inert gas originally at room temperature and typically at atmospheric pressure), on the order of about 0.1-10 liters per minute, may be introduced into the sample chamber 142 from an external gas source 148 to facilitate gas flow. A restriction valve 146 may be placed adjacent to the exit orifice 143 to restrict the flow of gaseous molecules out of the chamber 142.

While a portion of the gaseous neutral molecules (M) released from the sample diffuse toward the exit orifice 143, the low volume gas flow enhances the egress of the gaseous molecules from the sample chamber 142 to a third passageway 130 coupled to the exit orifice 143. The third passageway 130 extends from the exit orifice 143 of the sample chamber 142 at a first end to the ionization region 112 within the ionization chamber 110 at its second end. As depicted, both gaseous sample molecules (M) and nitrogen molecules ($N_2$) flow through the third passageway 130 into the ionization region 112.

Within the ionization region, a portion of the sample molecules (M) encounter primary ions (HA+) and are ionized thereby, in this case taking on a proton and converting to positive ion (M+H)+ as discussed above. A substantial portion of the primary ions and secondary ions derived from the gaseous neutral molecules are guided into a low pressure region in front of an entrance to the second passageway 120 leading to a mass spectrometer by electric fields generated by electrodes 115, 117 coupled to respective power supplies HV 1, HV 2. The neutral molecules sample molecules (M) may constitute an unknown analyte sample to be determined, but in some applications (M) may instead comprise a source mass calibrant molecules of known mass.

To accommodate the low volume gas flow passed through the sampling region 140, the embodiment shown in FIG. 2 also includes an exit conduit 160 coupled on one end to the ionization region 112 across from the second (proximate) end of third passageway 130. A portion of the primary ions (+) and secondary ions (M+H)+ do not enter the second passageway 120 but rather are carried by the flow of nitrogen gas ($N_2$) through the exit conduit 160 and then out into the ambient environment on its other end. The exit conduit 160 may include a restriction valve 162 to prevent back diffusion of gas within the exit conduit toward the ionization region 112. This is particularly important where the ionization region is maintained at or about atmospheric pressure. The gas within the exit conduit 160 may be at the same pressure (atmospheric) as the ionization region so a certain amount of back diffusion of gas molecules from the exit conduit toward the ionization region is possible. The exit conduit 160 need not be a separate passageway but may comprise openings, gaps or vents where gases can normally leak out of the chamber. In the latter case, flow restriction means would also be applied to restrict any back flow into the ionization chamber.

The embodiment of FIG. 2 may be particularly applicable for rapid analysis of forensic samples. For instance, during arson investigations, important forensic evidence often consists of wood samples taken from a burnt structure. From these samples, mass spectrometric analysis can be used to determine whether an accelerant or inflammable substance was applied to the wood, indicating the possibility of deliberate burning. Such a wood sample could be placed in a sample chamber and heated, allowing small concentrations of substances contained in the wood to be volatized and carried by the gas flow into the ionization region of the ion source apparatus. This process generally does not take a long time, since only a small amount of heat is required for wood (and many other substances) to release a sufficient amount of material for accurate detection of its constituents. In another technique for introducing gaseous neutrals, the neutrals are desorbed from beads (or objects of other shapes), which can be made from alumina, titanium dioxide, silica gel or any other absorbent material. In this technique the desorption rate of gaseous neutrals from the beads can be controlled by slight differences in heat applied to the beads due to the beads' high surface area. Accordingly, the front end of the detection process, sample preparation and ionization, can be performed easily and quickly, leaving more time for the analysis of detection results.

As discussed above, the apparatus of FIG. 2 can be used to ionize analyte samples and/or mass calibrants. For example, the apparatus may receive an analyte sample through the first passageway (not shown) and a calibrant through passageway 130, or vice versa.

Figure 3:
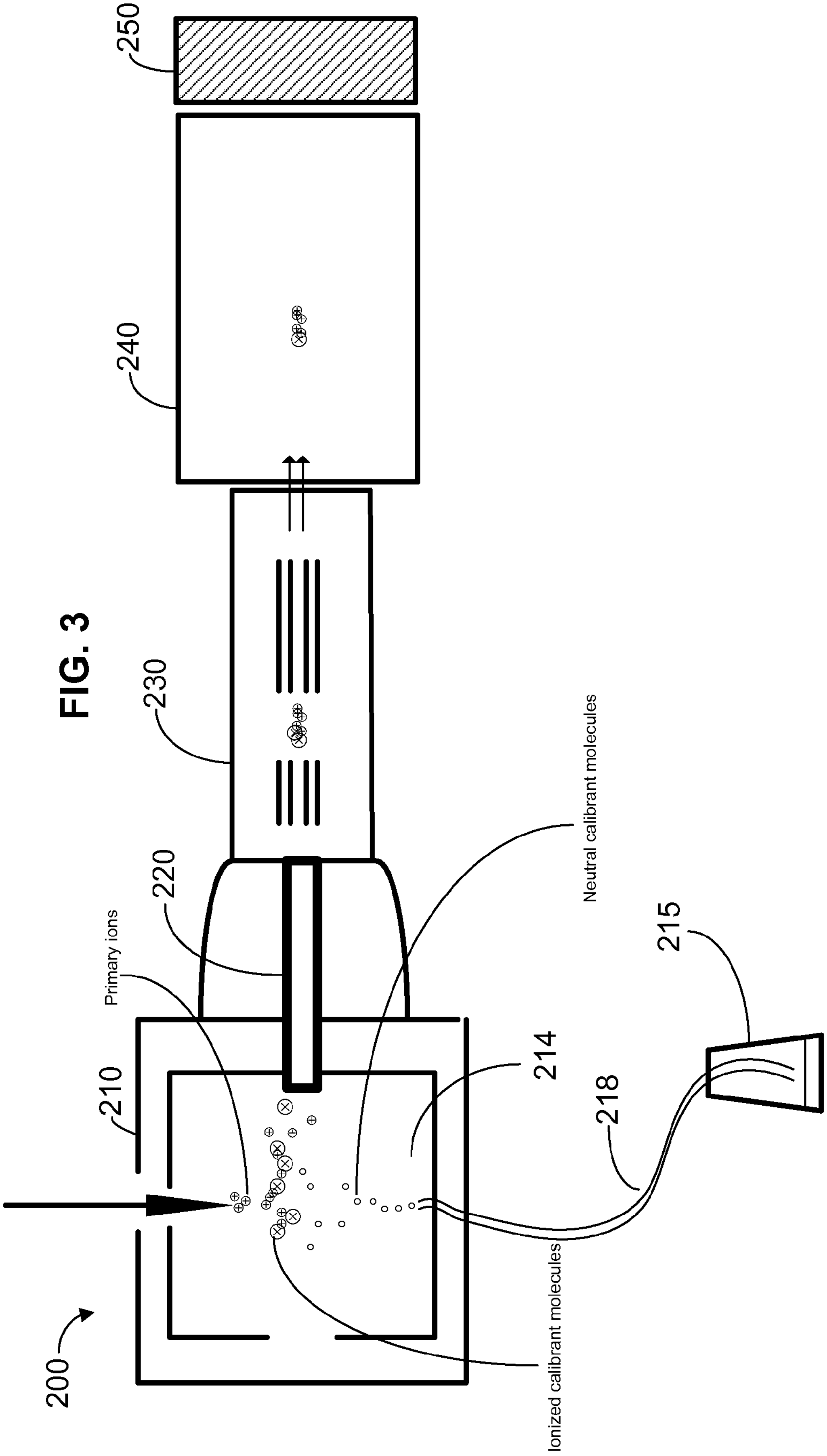
FIG. 3 shows an application of the ion source according to the present invention in which a mass calibrant is ionized and introduced into a mass spectrometer according to the method of the present invention.

FIG. 3 illustrates an example mass spectrometer system including an embodiment of another ion source according to the present invention with which mass calibration can be performed. The mass spectrometer system 200 includes an ion source 210 (which may comprise the apparatus or be coupled to the apparatus described in FIG. 1 or FIG. 2) in which volatilized neutral molecules are ionized by charge transfer and/or other mechanisms. The primary ions may include analyte ions that are to be detected and identified. In the depicted application, the neutral molecules comprise mass calibrants which may be provided in a reservoir 215 as a vapor or enriched gas; the reservoir may be situated externally from the mass spectrometer system 200 as shown. Calibrant molecules diffuse through a conduit 218 coupled on one end to the reservoir and emerge at the other end of the tube in the ionization apparatus 210. The volatized mass calibrant molecules diffuse into the ionization region, and are then ionized directly or by interaction with primary ions as described above.

This method of ionizing mass calibrant molecules within an ion source is easy to implement and does not require ionizing the mass calibrant molecules externally from the ion source or an additional ionization device, as is often provided in multimode ionization sources, because the mass calibrant ions can be generated by interaction with the primary ions, rather than by an independent ionization mechanism.

The primary ions and the mass calibrant ions within the ionization region of the ion source 210 can then be guided by electrostatic forces along with the primary ions into a conduit 220 leading to the mass analyzer 240 via a transport region 230 which may include ion optics such as a multipole guide. The mass analyzer 240 may comprise a TOF analyzer having a flight tube and other components such as an equalizer and a reflectron (both not shown). Packets of ions are released into the flight tube of a TOF analyzer in pulses; the kinetic energies of the ions are substantially equalized so that the flight times of different ion species through the chamber up to the detector 250 reflect the difference in their masses. The flight time of the mass calibrant is then used as a standard measurement for the correction of the detected flight times of the primary ions. Other mass analyzers are known in the art and can also be used as the mass analyzer 240, such as QTOF, FTMS, and orbitrap.

Thus, some embodiments of the present invention facilitate rapid and convenient detection of trace substances in a sample by providing an apparatus that receives gas-borne neutral sample molecules directly through an inlet, dispensing with the need for a specialized interface or chromatographic separation.

For example, the present invention provides an apparatus for ionizing an analyte sample and/or a mass calibrant that comprises an ionization chamber defining an ionization region, a first passageway coupled to the ionization region for delivering the analyte sample to the ionization region, a second passageway leading to a mass analyzer having an orifice arranged adjacent to the ionization region to receive ions from the ionization region, a third passageway coupled to the ionization chamber at a first end and having a second end with an orifice arranged to receive gaseous neutral mass calibrant molecules, and an ionization device arranged within the ionization chamber. The ionization device generates primary ions from the analyte sample and the primary ions ionize a portion of the gaseous neutral mass calibrant molecules received into the ionization region via the third passageway.

In another aspect, the present invention provides an apparatus for ionizing molecules from a sample that comprises an ionization chamber defining an ionization region, a first passageway coupled to the ionization region for delivering a primary material to the ionization chamber, a second passageway having an orifice arranged adjacent to the ionization region to receive ions from the ionization region, a third passageway coupled to the ionization chamber at a first end and having a second end with an orifice arranged to receive gaseous neutral molecules derived from the sample, and an ionization device arranged within the ionization chamber. The ionization device generates primary ions from the primary material provided via the first passageway to the ionization region, the primary ions ionizing a portion of the gaseous neutral molecules received into ionization region via the third passageway.

In yet another aspect, the present invention provides a mass spectrometry system for analyzing an analyte sample and/or a mass calibrant. The system comprises an apparatus that includes: an ionization chamber defining an ionization region, a first passageway coupled to the ionization region for delivering the analyte sample to the ionization region, a second passageway leading to a mass analyzer having an orifice arranged adjacent to the ionization region to receive ions from the ionization region, a third passageway coupled to the ionization chamber at a first end and having a second end with an orifice arranged to receive gaseous neutral mass calibrant molecules, and an ionization device arranged within the ionization chamber, the ionization device generating primary ions from the analyte sample, the primary ions ionizing a portion of the gaseous neutral mass calibrant molecules received into the ionization region via the third passageway. The system further includes a mass analyzer coupled to the downstream end of the second passageway and a detector situated downstream from the mass analyzer.

In yet another aspect, a method of ionizing molecules received from a sample situated external to an ion source is provided. The method comprises providing primary ions in an ionization region within the ion source through a primary passageway, receiving gaseous neutral molecules from the external sample into the ionization region within the ion source via a secondary passageway, a portion of the gaseous neutral molecules from the external sample being ionized by interaction with the primary ions within the ionization region, and guiding the primary ions and ions derived from the external sample to an inlet of a mass spectrometer.

The teachings herein can also be usefully applied to mass calibration of mass spectrometry systems. A method of calibrating a mass spectrometry system is provided which includes providing analyte ions in an ionization region within the ion source, receiving gaseous neutral mass calibrant molecules from a external source into the ionization region, a portion of the neutral mass calibrant molecules being ionized by interaction with the analyte ions produced in the ionization region, directing both mass calibrant ions and analyte ions downstream into the mass analyzer, and detecting the analyte ions and the mass calibrant ions in the mass analyzer.

The present invention also provides an apparatus for providing a mass calibrant sample to an ion source having a first passageway for receiving an analyte sample, a second passageway leading downstream to a mass spectrometer and a third passageway for receiving a mass calibrant. The apparatus comprises a chamber having an opening for receiving a mass calibrant sample, a first orifice adapted to be coupled to the third passageway leading to the ion source and a second orifice adapted to be coupled to a source of gas flow and a restriction valve coupled to the first orifice of the chamber adapted to limit gas flow from the chamber toward the ion source.

In some embodiments of the present invention, mass calibrants can be provided to an ion source in a holder that is detachable from the ion source. Thus, the holder contains a mass calibrant, particularly the slow-releasing mass calibrant formulation described below, and can be attached to an ion source for multiple mass scans. Upon depletion of the mass calibrant, the holder can be detached and refilled with calibrants again. The holder is in fluid communication with the ion source such that the calibrant, once vaporized or sublimated, can diffuse into the ion source from the holder. In some embodiments, the holder further comprises a separating device (e.g., a liquid chromatographic column or a gas chromatographic column) for separating the components in an analyte sample. In these embodiments, the separating device is configured to deliver its output (such as the eluant from an LC or GC column) to the ion source for ionization when the holder is attached to the ion source. Thus, these embodiments provide both the analyte sample and the mass calibrant.

Figure 4:
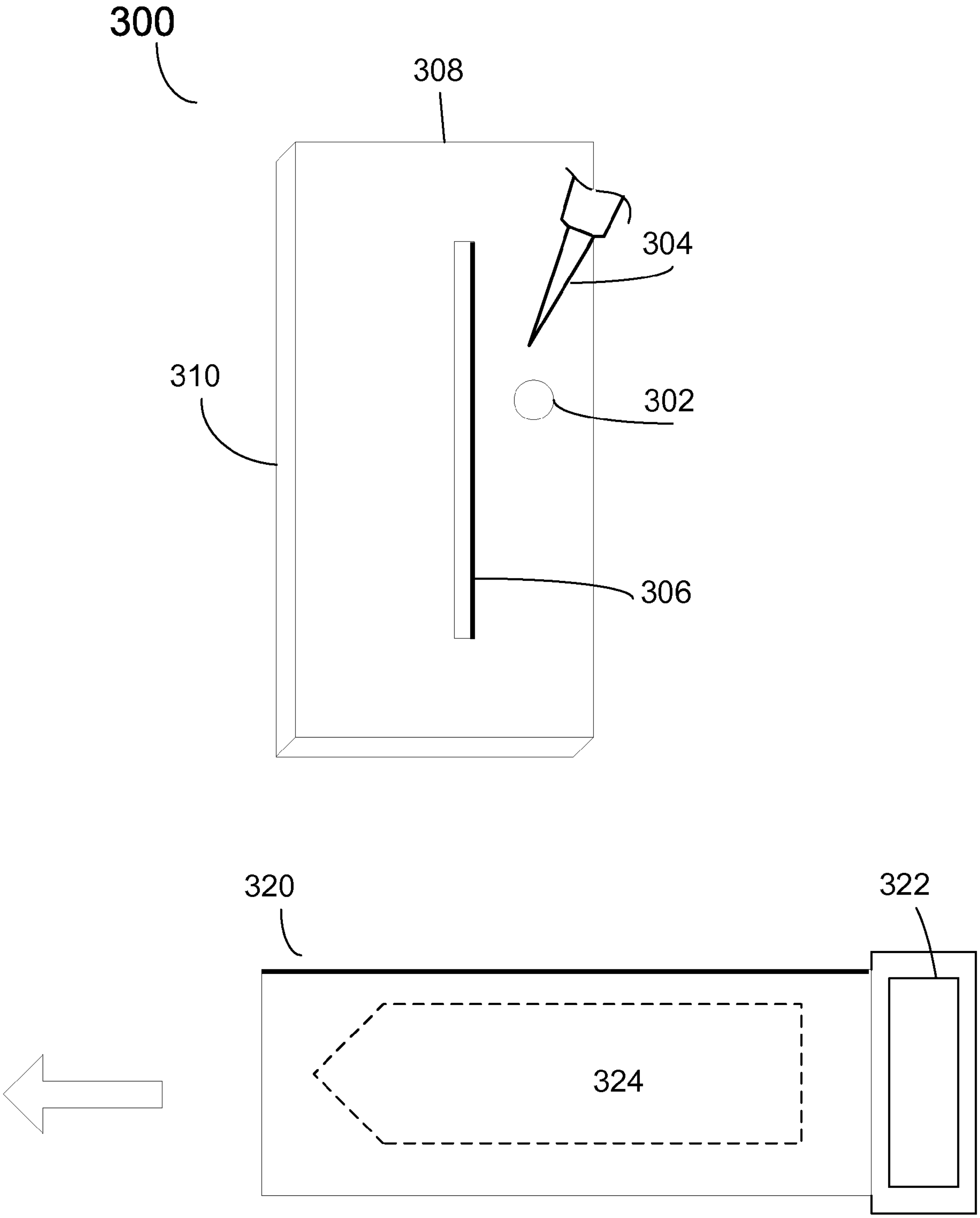
FIG. 4 shows part of an embodiment of a mass calibrant holder 300 and a separating chip 320 that can be used in conjunction with the holder.

FIG. 4 shows part of an embodiment of a mass calibrant holder. The holder has a top plate 300, which has a hole 302 reaching from the top surface 308 to the bottom surface 310 of the top plate 300. The hole 302 may be in any shape or size suitable for receiving a mass calibrant. Although not shown in the figure, the bottom surface 310 has a strip attached to it below the hole 302. The strip is made with an absorbent material. Thus, when a mass calibrant solution is delivered to the hole 302, such as by using a pipette tip 304 shown in FIG. 4, the mass calibrant solution is absorbed and contained in the strip on the bottom surface of the top plate. The top plate can be attached to the bottom part of the holder (not shown), and the holder is attached to an ion source in a manner that allows the air in the holder to diffuse into the ion source.

The top plate further comprises a slot 306 into which a separating chip can be inserted. An exemplary separating chip 320 is shown. The chip 320 has an area 324 that comprises a separating device, such as an HPLC column (for a detailed description of embodiments of separating chips, see, for example, U.S. Patent Application Publication Nos. 2007/0025887 and 2006/0202330). A handle 322 facilitates handling and insertion of the chip in the direction shown by the arrow.

Calibrant Moderators

The present invention also provides novel mass calibrant formulations comprising a low vapor pressure moderator to achieve a slow controlled evaporation rate. The formulations can be used to continuously supply a mass spectrometer with a calibrant without the need for frequent addition or replenishment of the calibrant.

The moderator has a vapor pressure that is lower than that of the mass calibrant (i.e., the moderator has a higher boiling point than the mass calibrant), thereby reducing the vapor pressure, and evaporation rate, of the formulation. In our experiments, when common mass calibrants were mixed with the moderators, the calibrant compounds evaporated at a very slow and steady rate, lasting up to 4300 minutes, depending on the compounds. For example, when Fluoronert FC-71, a moderator with a moderate vapor pressure, was mixed with prefluorphosphazine 1221, provided a calibrant signal for only 30 minutes. In contrast, when FC-71 was replaced with the same quantity of Fluoronert FC-70, a low vapor pressure material, the signal persisted for 4300 minutes. Without wishing to be bound by a theory, we believe that the length of signal duration and evaporation rate are determined by the combination of the partial pressure of each of the compounds at the specific concentration in the formulation.

The calibrant can typically be introduced in a liquid formulation, such as a solution, comprising the calibrant and at least one moderator. The moderator has a relatively low vapor pressure in the particular solvent, or in other forms to be used, at the temperature and pressure to be employed. Examples of moderators include, without being limited to, polyphenyl ether, polyfluoroalkyls, polyfluorophenyls, Fluoronert FC-70 series liquids from the 3M Corporation, and polysilicone materials. Other moderators include polysorbate, polyphenols, polyethosyphenols, and the like.

The calibrant compound has a higher vapor pressure relative to the moderator in the same condition. Typical calibrant compounds we tested include hydrocarbons, perfluorohydrocarbons, and perfluorophosphazines, particularly hydrocarbon methyl esters, such as methyl stearate, and octofluoronaphlene, a perfluorohydrocarbon. Mass calibrants are known in the art (see, e.g., U.S. Pat. No. 5,872,357).

The quantity of the calibrant in the formulation is chosen to give a desired signal level. The signal the longevity of the calibrant are determined by the partial pressure of the calibrant moving from a liquid phase to the vapor phase at a given temperature and chamber pressure. Typically an operating system with a chamber pressure of 760 Torr and a temperature of 323° C. will require a concentration range of 0.0001% to 30% calibrant in the formulation. The moderator can be at any concentration, such as about 70%, 75%, 80%, 85%, 90%, 91%, 92%, 93%, 94%, 95%, 96%, 97%, 98%, 99% or 99.5%. Typically it is between 90% and 99.9%.

The following examples are offered to illustrate this invention and are not to be construed in any way as limiting the scope of the present invention. While this invention is particularly shown and described with references to preferred embodiments thereof, it will be understood by those skilled in the art that various changes in form and details may be made therein without departing from the spirit and scope of the invention as defined by the appended claims.

In some embodiments, the formulation is provided to the ion source that ionizes the analyte sample, and the calibrant and the analyte are ionized together. For example, the formulation can be introduced into a mass spectrometer inlet in such as way that the vaporized molecules do not disturb either the aerodynamic gas flow or the electrostatic fields within the sampling region of the ion source.

In some other embodiments, the calibrant formulation is ionized separately, and the resulting ions are added to a mass spectrometer system in a region downstream from the analyte sample ion source, such as just prior to a mass analyzer. One implementation introduces the formulation into the mid section of the vacuum system where a second ion source converts the molecules into ions, which are guided into one region of the analyte ion beam with the vacuum system. Another approach provides a second ion source and merges the resulting ions into the sampling system of a mass spectrometer.

Exemplary Embodiments of the Present Invention

1. An apparatus for ionizing an analyte sample with a mass calibrant comprising:

an ionization chamber defining an ionization region;

a first passageway coupled to the ionization region for delivering the analyte sample to the ionization region;

a second passageway leading to a mass analyzer having an orifice arranged adjacent to the ionization region to receive ions from the ionization region;

a third passageway coupled to the ionization chamber at a first end and having a second end with an orifice arranged to receive gaseous neutral mass calibrant molecules; and an ionization device arranged within the ionization chamber, the ionization device generating primary ions from the analyte sample, the primary ions ionizing a portion of the gaseous neutral mass calibrant molecules received into the ionization region via the third passageway.

2. The apparatus of claim 1, further comprising:

a first electrode arranged within the ionization chamber adjacent to the ionization region and opposite the second passageway, the electrode being maintained at an electric potential for directing the primary ions and ions generated from the mass calibrant molecules toward the orifice of the second passageway.

3. The apparatus of claim 2, further comprising:

a second electrode adjacent to the second passageway, the second electrode maintained at potential difference with respect to the first electrode for directing the primary ions and the ions generated from the mass calibrant molecules toward the orifice of the second passageway.

4. The apparatus of any one of claims 1-3, wherein the ionization chamber is maintained at atmospheric pressure.

5. The apparatus of any one of claims 1-4, further comprising:

an exhaust conduit that extends from the ionization chamber into the third passageway.

6. The apparatus of any one of claims 1-5, further comprising:

an enclosure coupled to the third passageway for holding neutral mass calibrant molecules in a condensed phase; and an exit conduit coupled to the ionization chamber, the exit conduit including a restriction valve.

7. An apparatus for ionizing molecules from a sample comprising:

an ionization chamber defining an ionization region;

a first passageway coupled to the ionization region for delivering a primary material to the ionization chamber;

a second passageway having an orifice arranged adjacent to the ionization region to receive ions from the ionization region;

a third passageway coupled to the ionization chamber at a first end and having a second end with an orifice arranged to receive gaseous neutral molecules derived from the sample; and an ionization device arranged within the ionization chamber, the ionization device generating primary ions from the primary material provided via the first passageway to the ionization region, the primary ions ionizing a portion of the gaseous neutral molecules received into ionization region via the third passageway.

8. The apparatus of claim 7, further comprising:

a first electrode arranged within the ionization chamber adjacent to the ionization region and opposite the second passageway, the electrode being maintained at an electric potential for directing the primary ions and ions generated from the gaseous neutral molecules toward the orifice of the second passageway.

9. The apparatus of claim 8, further comprising:

a second electrode adjacent to the second passageway, the second electrode maintained at potential difference with respect to the first electrode for directing the primary ions and the ions generated from the gaseous neutral molecules toward the orifice of the second passageway.

10. The apparatus of any one of claims 7-9, wherein the ionization chamber is maintained at atmospheric pressure.

11. The apparatus of any one of claims 7-10, further comprising:

a sampling chamber for enclosing the sample coupled to the third passageway.

12. The apparatus of claim 11, further comprising:

a heating device situated adjacent to the sampling chamber for volatilizing molecules from the sample.

13. The apparatus of any one of claims 7-12, wherein the secondary ions are generated by a process of charge transfer from the primary ions.

14. The apparatus of any one of claims 7-13, further comprising:

an exhaust conduit coupled to the ionization chamber and arranged opposite from the third passageway for receiving exhaust gas flow from the ionization chamber.

15. The apparatus of claim 14, wherein the exhaust conduit includes a restriction valve adapted to reduce backward gaseous flow into the ionization chamber.

16. A mass spectrometry system for analyzing an analyte sample and/or a mass calibrant, comprising:

an apparatus including:

an ionization chamber defining an ionization region;

a first passageway coupled to the ionization region for delivering the analyte sample to the ionization region a second passageway leading to a mass analyzer having an orifice arranged adjacent to the ionization region to receive ions from the ionization region;

a third passageway coupled to the ionization chamber at a first end and having a second end with an orifice arranged to receive gaseous neutral mass calibrant molecules; and an ionization device arranged within the ionization chamber, the ionization device generating primary ions from the analyze sample, the primary ions ionizing a portion of the gaseous neutral mass calibrant molecules received into the ionization region via the third passageway;

a mass analyzer coupled to the downstream end of the second passageway; and a detector situated downstream from the mass analyzer.

17. The mass spectrometry system of claim 16, wherein the mass analyzer comprises a time-of-flight (TOF) analyzer.

18. The mass spectrometry system of claim 16 or 17, further comprising:

a sampling chamber coupled to the third passageway for holding neutral condensed-phase mass calibrant molecules.

19. The mass spectrometry system of any one of claims 16-18, further comprising:

a heating device situated adjacent to the sampling chamber for volatilizing the mass calibrant molecules.

20. The mass spectrometry system of any one of claims 16-19, further comprising:

an exhaust conduit coupled to the ionization chamber and arranged approximately opposite from the third passageway for receiving exhaust gas flow from the ionization chamber.

21. A method of ionizing molecules received from a sample situated external to an ion source, the method comprising:

providing primary ions in an ionization region within the ion source through a primary passageway; and receiving gaseous neutral molecules from the external sample into the ionization region within the ion source via a secondary passageway, a portion of the gaseous neutral molecules from the external sample being ionized by interaction with the primary ions within the ionization region; and guiding the primary ions and ions derived from the external sample to an inlet of a mass spectrometer.

22. The method of claim 21, further comprising:

heating the sample to volatilize molecules in the sample into a gaseous phase.

23. The method of claim 21 or 22, wherein the primary ions are generated by an electrospray process within the ion source.

24. The method of any one of claims 21-23, wherein the primary ions comprise analyte ions and the neutral molecules of the external sample comprise a mass calibrant.

25. The method of any one of claims 21-24, further comprising:

applying a low volume gas flow to facilitate movement of the gaseous neutral molecules from the sample into the ion source.

26. The method of any one of claims 21-25, wherein the secondary passageway is exposed to an ambient environment and the gaseous neutral molecules from the sample diffuse into the ion source through the secondary passageway.

27. A method of calibrating a mass spectrometry system comprising:

providing analyte ions in an ionization region within the ion source;

receiving gaseous neutral mass calibrant molecules from a external source into the ionization region, a portion of the neutral mass calibrant molecules being ionized by interaction with the analyte ions produced in the ionization region;

directing both mass calibrant ions and analyte ions downstream into the mass analyzer; and detecting the analyte ions and the mass calibrant ions in the mass analyzer.

28. The method of claim 27, wherein the mass analyzer comprises a time-of-flight (TOF) mass analyzer.

29. The method of claim 27 or 28, wherein the primary ions are generated by an electrospray process within the ion source.

30. An apparatus for providing a mass calibrant sample to an ion source having a first passageway for receiving an analyte sample, a second passageway leading downstream to a mass spectrometer and a third passageway for receiving a mass calibrant, the apparatus comprising:

a chamber having an opening for receiving a mass calibrant sample, a first orifice adapted to be coupled to the third passageway leading to the ion source and a second orifice adapted to be coupled to a source of gas flow; and a restriction valve coupled to the first orifice of the chamber adapted to limit gas flow from the chamber toward the ion source.

31. The apparatus of claim 30, further comprising:

a heating device arranged adjacent to the chamber.

32. A calibrant formulation, comprising a mass calibrant and a moderator substance, said moderator substance having a lower vapor pressure than the mass calibrant.

33. The calibrant formulation of claim 32, wherein the mass calibrant is present in an amount of about 0.1% to about 10%.

34. The calibrant formulation of claim 32 or 33, wherein the vapor pressure of the mass calibrant is at least twice as high as the vapor pressure of the moderator.

35. The calibrant formulation of claim 32, 33, or 34, wherein the moderator is selected from the group consisting of polyphenyl ether, polyfluoroalkyls, polyfluorophenyls, Fluoronert FC-70 series liquids, polysilicone, polysorbate, polyphenols, and polyethosyphenols 36. The calibrant formulation of claim 32, 33 or 34, wherein the moderator is FC-70.

37. A method of providing a mass calibrant to a mass spectrometer system, said method comprising subjecting a mixture of the mass calibrant and a moderator substance to ionization by an ion source, and providing the resultant ions to the mass spectrometer system.

38. The method of claim 37, wherein the mass calibrant is ionized along with an analyte sample.

39. The method of claim 37 or 38, wherein the mass calibrant is present in an amount of about 0.1% to about 10% in the mixture.

40. The method of claim 37, 38, or 39, wherein the vapor pressure of the mass calibrant is at least twice as high as the vapor pressure of the moderator.

41. The method of any one of claims 37-40, wherein the moderator is selected from the group consisting of polyphenyl ether, polyfluoroalkyls, polyfluorophenyls, Fluoronert FC-70 series liquids, polysilicone, polysorbate, polyphenols, and polyethosyphenols 42. The method of any one of claims 37-40, wherein the moderator is FC-70.

43. A kit comprising a mass calibrant and a moderator substance, wherein the moderator substance has a lower vapor pressure than the mass calibrant.

44. The kit of claim 43, wherein the vapor pressure of the mass calibrant is at least twice as high as the vapor pressure of the moderator.

45. The kit of claim 43 or 44, wherein the moderator is selected from the group consisting of polyphenyl ether, polyfluoroalkeyls, polyfluorophenyls, Fluoronert FC-70 series liquids, polysilicone, polysorbate, polyphenols, and polyethosyphenols 46. The kit of claim 43 or 44, wherein the moderator is FC-70.

47. A holder for providing a mass calibrant to an ion source, the holder comprising:

a chamber for containing the mass calibrant; and an attachment piece via which the holder can be attached to the ion holder, wherein when the holder is attached to the ion source, the chamber is in fluid communication with the ion source.

48. The holder of claim 47, further comprising a separating device for separating components in a sample.

49. The holder of claim 48, wherein the separating device is a liquid chromatographic or gas chromatographic column.

EXAMPLE

In this application, the following abbreviations have the following meanings. Abbreviations not defined have their generally accepted meanings.

° C.=degree Celsius
hr=hour
min=minute
sec=second
M=molar
mM=millimolar
μM=micromolar
nM=nanomolar
ml=milliliter
μl=microliter
nl=nanoliter
mg=milligram
μg=microgram FT-ICR=Fourier transform ion cyclotron resonance
LC=liquid chromatography
GC=gas chromatography
MS=mass spectrometer
MALDI=matrix assisted laser desorption ionization
ESI=electrospray ionization
APCI=atmospheric pressure chemical ionization
TOF=time-of-flight Example 1

A sample of a known chemical having isotopic molecular weight of approximately 303 was introduced by way of the third passageway of an ionization apparatus according to FIG. 1. During monitoring in scan mode a mass was detected at m/z of 304 (indicating the addition of a proton), and the level detected increased whenever the sample was placed near the orifice 38, indicating that the chemical was diffusing into the apparatus against the exhaust flows and being ionized therein.

All of the publications, patents and patent applications cited above or elsewhere in this application are herein incorporated by reference in their entirety to the same extent as if the disclosure of each individual publication, patent application or patent was specifically and individually indicated to be incorporated by reference in its entirety.

A number of embodiments of the invention have been described. Nevertheless, it will be understood that various modifications may be made without departing from the spirit and scope of the invention.

The invention claimed is:

1. A calibrant formulation, comprising a mixture of a mass calibrant and a moderator substance, said moderator substance having a lower vapor pressure than the mass calibrant, wherein said mass calibrant is present in said calibrant formulation in an amount of about 0.1% to about 10%.

2. The calibrant formulation of claim 1, wherein the vapor pressure of the mass calibrant is at least twice as high as the vapor pressure of the moderator.

3. The calibrant formulation of claim 1, wherein the moderator is selected from the group consisting of polyphenyl ether, polyfluoroalkyls, polyfluorophenyls, polysilicone, polysorbate, polyphenols, and polyethosyphenols.

4. The calibrant formulation of claim 1, wherein the moderator is FC-70.

5. A method of providing a mass calibrant to a mass spectrometer system, said method comprising subjecting a mixture of the mass calibrant and a moderator substance to ionization by an ion source, providing the resultant mass calibrant ions to the mass spectrometer system and using said resultant mass calibrant ions to calibrate said mass spectrometer system.

6. The method of claim 5, wherein the mass calibrant is ionized along with an analyte sample.

7. The method of claim 5, wherein the mass calibrant is present in an amount of about 0.1% to about 10% in the mixture.

8. The method of claim 5, wherein the vapor pressure of the mass calibrant is at least twice as high as the vapor pressure of the moderator.

9. The method of claim 5, wherein the moderator is selected from the group consisting of polyphenyl ether, polyfluoroalkyls, polyfluorophenyls, polysilicone, polysorbate, polyphenols, and polyethosyphenols.

10. The method of claim 5, wherein the moderator is FC-70.

* * * * *